B. M. W. HANSON.
METHOD OF AND APPARATUS FOR GENERATING FORMERS FOR MILLING MACHINES.
APPLICATION FILED AUG. 15, 1917.
1,302,540.
Patented May 6, 1919.
3 SHEETS—SHEET 1.
Fig. 1.
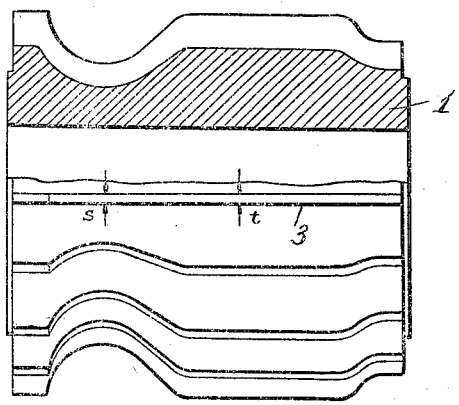
Fig. 2.
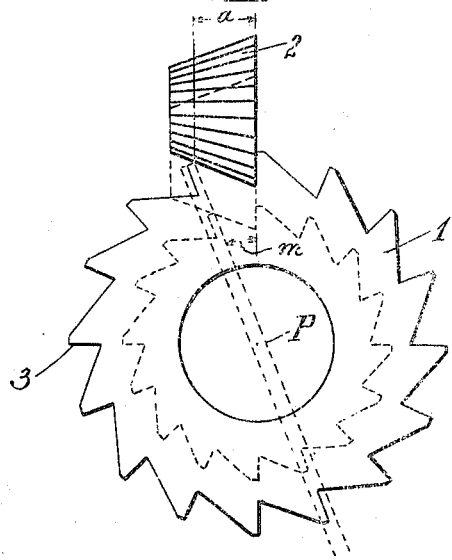
Fig. 5.
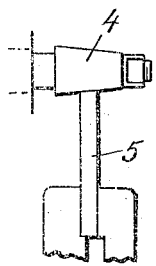
Fig. 3.
Fig. 4.
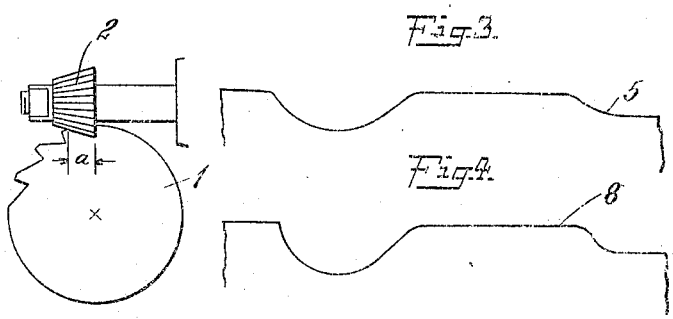
Fig. 6.
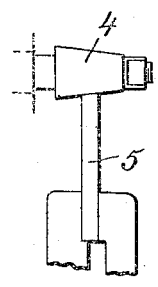
Fig. 7.
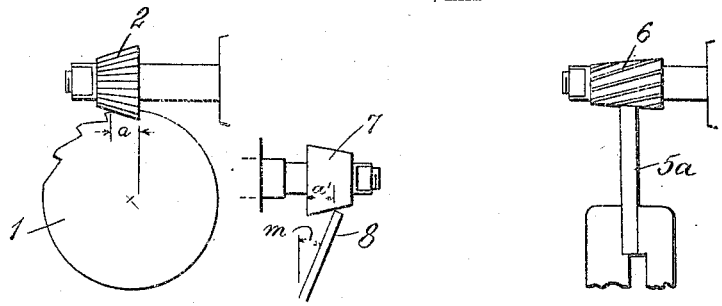
INVENTOR
Bengt M. W. Hanson
BY S. Jay Teller
ATTORNEY

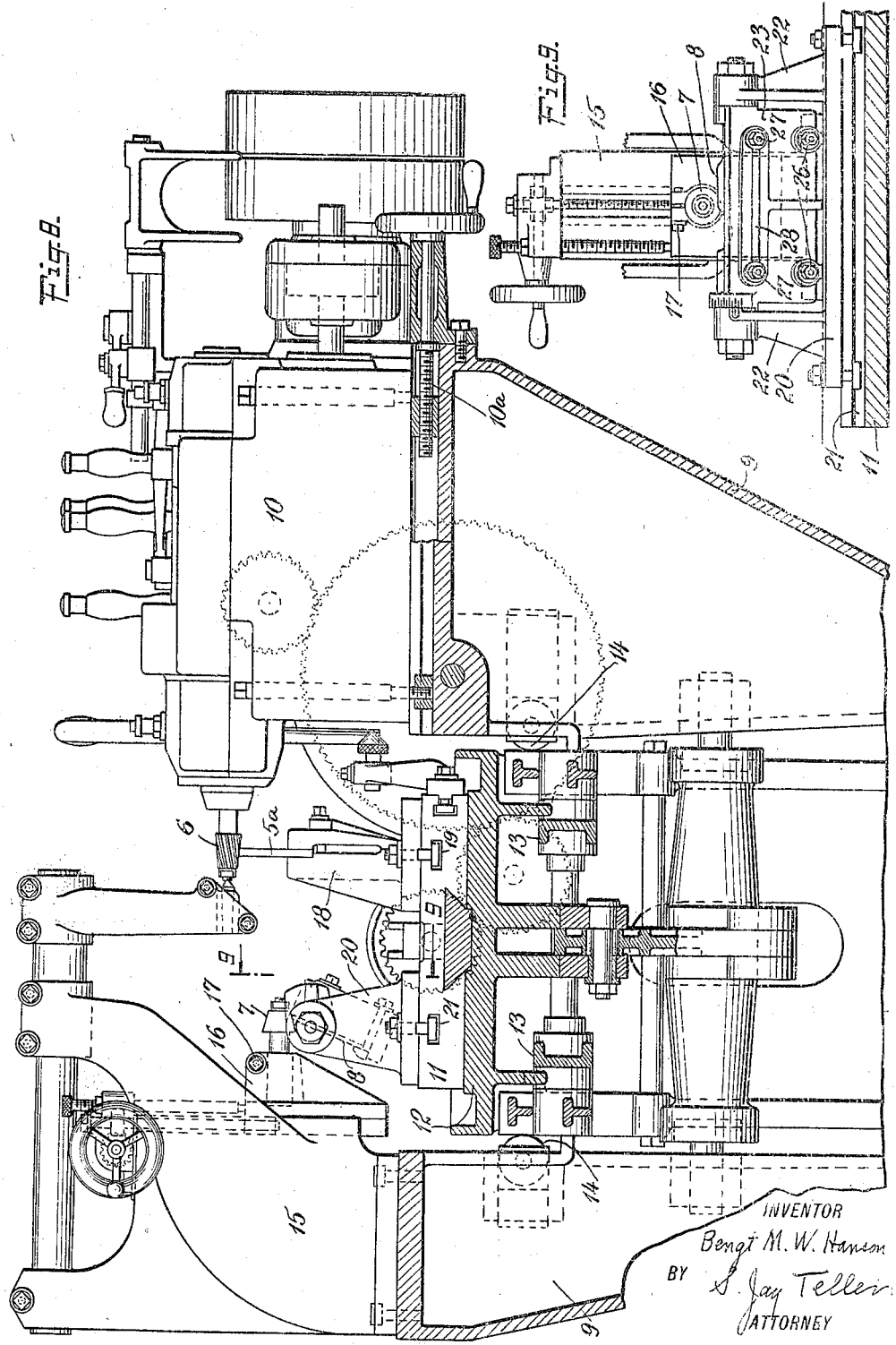

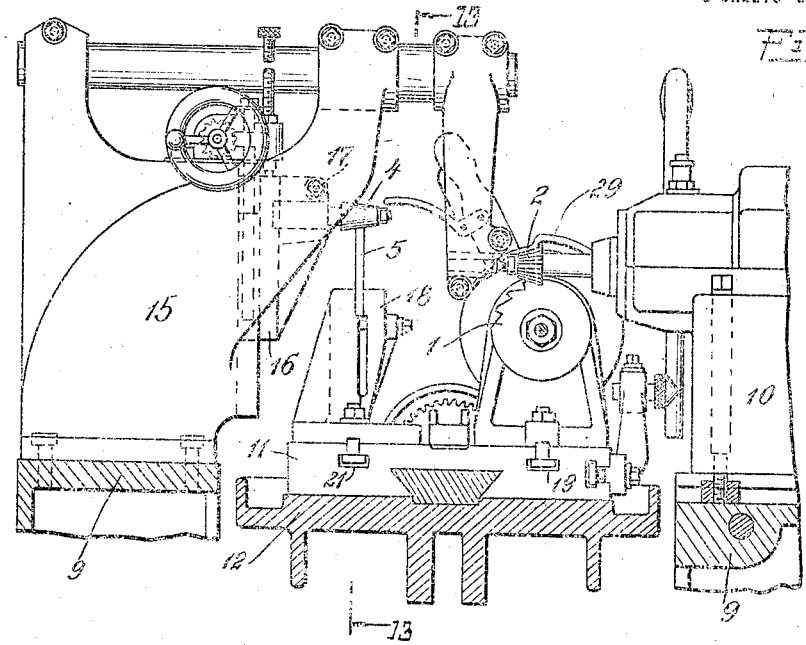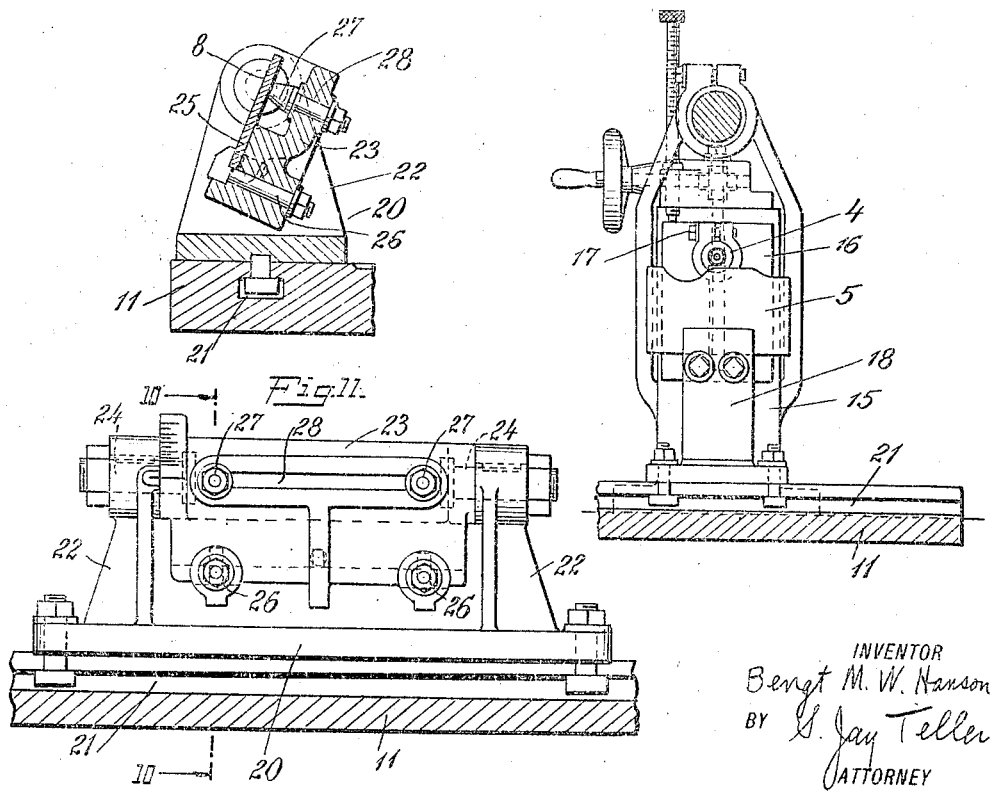

UNITED STATES PATENT OFFICE.

BENGT M. W. HANSON, OF HARTFORD, CONNECTICUT, ASSIGNOR TO PRATT & WHITNEY COMPANY, OF NEW YORK, N. Y., A CORPORATION OF NEW JERSEY.

METHOD OF AND APPARATUS FOR GENERATING FORMERS FOR MILLING-MACHINES.

1,302,540.  Specification of Letters Patent.  Patented May 6, 1919.

Application filed August 15, 1917. Serial No. 186,299.

*To all whom it may concern:*

Be it known that I, BENGT M. W. HANSON, a citizen of the United States, residing at Hartford, in the county of Hartford and State of Connecticut, have invented certain new and useful Improvements in Methods of and Apparatus for Generating Formers for Milling-Machines, of which the following is a specification.

The method and apparatus constituting my invention are especially adapted for generating formers for milling machines of the type set forth in my copending application for contour cutter milling machines, Ser. No. 186,298, filed on even date herewith.

In order that the method and apparatus may be fully understood, I will herein refer more or less specifically to a machine such as that set forth in the said application, but it will be understood that the present invention can be used in connection with machines differing quite widely from that set forth.

A milling machine, as set forth in the said application, comprises a normally fixed rotatable milling cutter and a work-carrying table which is horizontally movable underneath the cutter at an angle to the axis thereof. The blank to be milled is secured to the table with its axis extending longitudinally thereof, and means are provided whereby the blank can be indexed. The machine is adapted for milling blanks of irregular contours, and, in order that the cutter may follow the contour to a greater or less extent, the table is bodily movable vertically under the guidance of a former and former pin, one of which is secured to the table and the other of which is fixed.

In the accompanying drawings I have illustrated diagrammatically the several process steps constituting one part of my invention, and I have also illustrated the preferred form of apparatus constituting another part of the invention, the method and apparatus being illustrated in connection with a machine such as that set forth in my aforesaid copending application.

Of the drawings:

Figure 1 is a side view, partly in section, of a cutter for which a former is to be generated in accordance with my invention.

Fig. 2 is an end view of the cutter shown in Fig. 1, two of the positions of the operating cutter being indicated.

Fig. 3 is a side view of the former to be generated.

Fig. 4 is a side view of the temporary former used in generating the former shown in Fig. 3.

Fig. 5 is a diagrammatic view showing the normal operation of milling a blank.

Fig. 6 is a diagrammatic view similar to Fig. 5 but showing the operating cutter in a different position of adjustment.

Fig. 7 is a diagrammatic view showing the operation of generating the former used in the operations illustrated in Figs. 5 and 6.

Fig. 8 is a fragmentary view of the milling machine in use for carrying out the operation illustrated diagrammatically in Fig. 6.

Fig. 9 is a fragmentary view of the machine taken along the line 9—9 of Fig. 8.

Fig. 10 is a vertical sectional view showing the fixture for holding the temporary former as illustrated in Figs. 8 and 9. This section is taken along the line 10—10 of Fig. 11.

Fig. 11 is a side view of the fixture shown in Fig. 10.

Fig. 12 is a fragmentary view similar to Fig. 8 showing the machine in use for the normal operation of milling a blank. In this view, the former shown as being generated in Fig. 7, appears in normal use.

Fig. 13 is a fragmentary view of the machine taken along the line 13—13 of Fig. 12.

Referring to the drawings, 1 represents the finished cutter for the milling of which the former is to be generated. This cutter is shown as having an irregular longitudinal contour, and it will be understood that this contour can be varied infinitely as required by the character of the work to be done. Fig. 2 shows an end view of the cutter 1, the full lines representing the teeth at the point of maximum diameter and the dotted lines representing the teeth at the point of minimum diameter. In making the cutter the milling machine is supplied with a blank having the required contour and then the blank is fed longitudinally under the operating cutter, which is indicated at 2, being moved upward and downward as required so that the cutter 2 may follow the contour to a greater or less extent.

For cutters of this type it is essential, or at least highly preferable, that the "land" 3 between each two adjacent grooves shall be of substantially uniform width from end to end of the cutter. For instance, as shown in Fig. 1, the width at the point $s$ of minimum diameter is the same as at the point $t$ of maximum diameter. By referring again to Fig. 2 it will be obvious that, in order to leave such a uniform width of land, the size of the groove must be less where the diameter is small than it is where the diameter is large. The contour of the bottom of the groove therefore will not be the same as the contour of the outside of the blank, but will differ therefrom approximately as illustrated in Fig. 1.

The former to be used in the machine must have a contour approximating that of the bottom of the groove and differing materially from that of the outside of the cutter. The present invention provides a method and an apparatus whereby a former can be generated having the required contour, use being made in such generation of a former having the contour of the outside of the cutter. This primary former can advantageously be the same former which is to be subsequently used in another machine for guiding a grinding wheel to properly grind and relieve the exterior of the cutter.

Fig. 5 shows diagrammatically the normal operation of milling a blank. The cutter 2 is rotatable about a fixed axis and the blank 1 is moved longitudinally under the cutter. A fixed former pin 4 is provided which is engaged by a former 5 secured to the table which carries the blank 1. The former 5 has a contour corresponding to the contour of the bottom of the groove as shown in Fig. 1. The former 5 is maintained in engagement with the pin 4 as the table moves longitudinally and thus the blank 1 is moved upward or downward as required to cause the cutter 2 to cut grooves which vary in depth in the desired manner.

Instead of cutting the teeth with radial front faces, as shown in Figs. 2 and 5, it is sometimes desirable to slightly undercut the teeth, that is, to provide them with front faces which are inclined backward slightly from the radial planes. Such undercutting is effected by setting the cutter 2 in the position shown in Fig. 6.

For generating the former 5 the same machine is used and the operation is illustrated in Fig. 7. A cutter 6 is substituted for the normal operating cutter, this cutter 6 having the same size and shape as the normal former pin 4. For the normal former pin there is substituted a temporary former pin 7 having the same size and shape as the normal operating cutter 2. A temporary former 8 having the contour of the outside of the blank, is secured to the table at an angle corresponding to the number of teeth with which the blank is to be provided. By referring again to Fig. 2, it will be seen that one edge of the land between two adjacent grooves lies in a radial plane, and it will therefore be clear that the other edge of the land will lie in a plane such as P parallel to the aforesaid radial plane. The angle between the plane P and the vertical radial plane is represented by $m$, this angle being the same as the angle between two adjacent teeth. The width of the finished groove at some definite point as, for instance, the point of maximum diameter, is determined, this being represented by $a$ in Figs. 2 and 3.

Returning now to Fig. 7, let it be borne in mind that the pin 7 has the same size and shape as the operating cutter and that the former 8 has the same contour as the blank to be cut. If the former 8 be set at the angle $m$, and in such relation to the former pin that the distance $a'$ is equal to the distance $a$, the former, as it is moved longitudinally, will be made to have upward and downward movements which are exactly the same as the movements which the blank must subsequently have to be properly grooved.

Also connected to the table which carries the temporary former 8 is a former blank 5$^a$ which is adapted to be engaged by the temporary cutter 6. As the table is moved longitudinally and is also moved upward and downward under the guidance of the temporary former 8, as already described, the blank 5$^a$ is carried past the cutter 6 and is moved upward and downward and is milled to have exactly the contour which is required. After the blank 5$^a$ is completely milled to produce the former 5, the normal operating cutter 2 and the normal former pin 4 are put in place and the former 5 is also put in place, as indicated in Figs. 5 and 6. Then the milling of the blank 1 can take place in the way already described.

Figs. 8 and 9 show the machine in operation carrying out the process step which is indicated diagrammatically in Fig. 7. As has already been made clear, the structural features of the machine do not of themselves constitute any part of the present invention, and it will therefore be sufficient to refer to these features very briefly. 9 represents the main frame of the machine, and mounted on this frame is a headstock 10 having a horizontal spindle which carries the operating cutter represented as 6 in Fig. 8. The headstock 10 is transversely adjustable to a limited extent by means of the screw 10$^a$. A table 11 is mounted on a carriage 12, the carriage itself being vertically movable in parallelism under the guidance of links such as shown at 13, 13 and rollers such as shown at 14, 14. The table is slidable on the carriage along lines at right angles to the axis of the cutter. Mounted on the main frame 9 is a bracket 15 which carries the former pin which is represented as 7 in Figs. 8 and 9. Preferably there is a slide 16 by means of which the former pin can be adjusted vertically. The pin is capable of longitudinal adjustment in the slide, that is, transversely of the former, and can be clamped in adjusted position by means of a screw 17.

A vise 18 is provided for holding the former blank 5ª, and preferably this is the same vise which is afterward used for holding the finished former 5. This vise is adapted to be secured to the table by means of bolts engaging a longitudinal T-slot 19.

A special fixture 20 is provided for holding the temporary former 8, this fixture being adapted to be secured to the table by means of bolts entering a longitudinal T-slot 21. The fixture 20 is shown in detail in Figs. 10 and 11. It comprises a base plate or frame having two upward projecting horizontally apertured brackets 22, 22. Positioned between the brackets 22, 22 is a yoke 23 which has bearings on pins 24, 24 extending through the apertures of the brackets 22, 22. The yoke 23 can be adjusted on these pins and after adjustment can be clamped in place by means of the nuts on the ends of the pins. The yoke 23 is provided at 25 with a ledge adapted to support the temporary former 8, and by means of bolts 26, 26 having projecting heads, the former can be clamped in place. Preferably, for supporting the upper part of the former, there are two pins 27, 27 which are adjustable horizontally in a slot 28 in the yoke. These pins can be adjusted in accordance with the length of the former or in accordance with the shape thereof so as to support it at the most advantageous points.

Preferably the yoke 23 is provided with graduations adapted to register with a mark on one of the brackets 22 so that the former can be readily set to the proper angle corresponding to the desired number of teeth in the cutter to be milled.

The operation of the machine, as shown in Fig. 8 will be clear from the description which has already been given in connection with the diagrammatic Fig. 7, and it is believed that repetition is unnecessary.

Figs. 12 and 13 show the machine in operation carrying out the normal milling of a blank as illustrated diagrammatically in Figs. 5 and 6. The former 5 is held by the vise 18 which has been moved from the position shown in Fig. 8, and which is now secured by bolts entering the T-slot 21. The blank 1 is secured to the table by means of suitable devices which may include an indexing head 29 held in place by bolts entering the T-slot 19 in the table. The temporary cutter 6 has been replaced by the normal operating cutter 2 and the temporary former pin 7 has been replaced by the normal former pin 4. The former pin 4 has been adjusted vertically so as to bring the cutter into the proper relationship with the blank to cut grooves of the desired size.

What I claim is:

1. The hereindescribed method of generating a former for a milling machine having a rotatable operating cutter, a horizontally movable blank carrying table and a former and a former pin for controlling relative vertical movements between the table and the cutter, whereby the machine is adapted to cut spaced longitudinal grooves in a blank of varying diameter and to vary the depth of cut so as to leave a land of uniform width between each two adjacent grooves, the method consisting in substituting a temporary former pin having the size and shape of the normal operating cutter, substituting a temporary cutter having the size and shape of the normal former pin, securing a former blank to the table in operative relation to the temporary cutter, locating in engagement with the temporary former pin a temporary former positioned at an angle corresponding to the desired angle between the grooves to be cut and having the contour of the blank to be grooved, and then operating the machine to mill the former blank while maintaining the temporary former and the temporary former pin in engagement with each other.

2. The hereindescribed method of generating a former for a milling machine having a rotatable operating cutter, a horizontally movable blank carrying table and a former and a former pin for controlling relative vertical movements between the table and the cutter, whereby the machine is adapted to cut spaced longitudinal grooves in a blank of varying diameter and to vary the depth of cut so as to leave a land of uniform width between each two adjacent grooves, the method consisting in substituting a temporary former pin having the size and shape of the normal operating cutter, adjusting the temporary former pin longitudinally to a position corresponding to the proposed longitudinal adjustment of the operating cutter, substituting a temporary cutter having the size and shape of the normal former pin, securing a former blank to the table in operative relation to the temporary cutter, locating in engagement with the temporary former pin a temporary former positioned at an angle corresponding to the desired angle between the grooves to be cut and having the contour of the blank to be grooved, and then operating the machine to mill the former blank while maintaining the temporary former and the temporary former pin in engagement with each other.

3. An apparatus for generating a former for a milling machine having a rotatable operating cutter, a horizontally movable blank-carrying table, a former and a former pin for controlling relative vertical movements between the table and the cutter, whereby the machine is adapted to cut spaced longitudinal grooves in a blank of varying diameter and to vary the depth of cut so as to leave a land of uniform width between each two adjacent grooves, the apparatus comprising in combination with the table and other parts of the machine, a temporary former pin having the size and shape of the normal operating cutter, a temporary cutter having the size and shape of the normal former pin, means for securing a former blank to the table in operative relation to the temporary cutter and means for holding a temporary former in engagement with the temporary former pin at an angle corresponding to the desired angle between the grooves to be cut whereby the machine may be operated to mill the former blank while maintaining the temporary former and the temporary former pin in engagement with each other.

In testimony whereof, I hereto affix my signature.

BENGT M. W. HANSON.

Copies of this patent may be obtained for five cents each, by addressing the "Commissioner of Patents. Washington, D. C."